United States Patent Office 2,888,495
Patented May 26, 1959

2,888,495
PURIFICATION OF PERCHLOROETHYLENE

Lehr F. Kissling, Wadsworth, Ohio, assignor to Columbia-Southern Chemical Corporation, a corporation of Delaware No Drawing. Application July 5, 1957
Serial No. 669,977

8 Claims. (Cl. 260—654)

The present invention relates to the manufacture of perchloroethylene and is more particularly concerned with the purification of perchloroethylene.

In the manufacture of perchloroethylene, an acidic perchloroethylene product, e.g. having a pH below 7, frequently is obtained. Thus, perchloroethylene prepared by thermal pyrolysis and chlorination of an aliphatic hydrocarbon such as propane frequently has a pH below 4.0. Also, perchloroethylene prepared by the vapor phase dehydrochlorination and chlorination of tetrachloroethane is generally acidic and below about pH 4.0. This acidity is found in the purified product despite purification by prior fractional distillations.

Perchloroethylene is a well known commercial solvent, finding wide application as a degreasing and dry cleaning agent. The presence of acidity (or use of perchloroethylene below pH 7) is regarded as a serious deterrent in these uses. For example, in the dry cleaning of garments, rugs and various other textiles, the presence of acidity in the dry cleaning solvent is undesirable, apparently seriously damaging the cleaned material.

According to this invention, acidic perchloroethylene is treated simply and efficiently to remove or reduce its acidity to a tolerable level. Thus, it has been found that by contacting intimately acidic perchloroethylene and a synthetic, organic carbonaceous ion-exchange resin a substantial reduction or even essentially complete removal of acidity may be accomplished. Removal of acidity in the manner of this invention offers benefits which are not achieved merely by washing the perchloroethylene with an aqueous alkaline solution such as sodium hydroxide or calcium hydroxide.

Although it is not intended that the present invention be construed as limited in accordance with the following explanation, it is believed the treatment with ion-exchange resins effectively removes three general types of aciduous materials regarded as responsible for imparting acidity to perchloroethylene. One type of acidity is caused by the presence of inorganic or mineral acidity, notably by hydrogen chloride. Simple washing with water or aqueous alkaline materials at least partially removes such acidity. However, the other two classes of aciduous materials are not removed effectively by water washing or treatment with aqueous alkaline materials. The remaining acidity is believed to be caused by (1) organic acids which are insoluble or but slightly soluble in aqueous solutions, and (2) acid-forming organic materials insoluble or only slightly soluble in aqueous solutions. It is in the partial or complete removal of organic aciduous materials that this invention is especially advantageous by comparison with aqueous alkaline treatment, although ion-exchange resin treatment of perchloroethylene will also remove inorganic acid materials.

Treatment of perchloroethylene by contact with ion-exchange resin is especially noteworthy in affording a more permanent reduction in acidity than does aqueous alkaline washing. Perchloroethylene from which acidity has been removed by an aqueous alkaline wash redevelops acidity upon standing. Redevelopment of acidity to the degree encountered with aqueous alkaline treatment may be avoided by this invention.

In accordance with this invention, it has been found that removal of the acidic content or contaminants from acidic perchloroethylene by contact with ion-exchange resin is most effective when the ion-exchange resin is at least wet or moist, and preferably is flooded with water. That is, the removal of acidity from perchloroethylene by intimate contact with ion-exchange resin is most complete when the perchloroethylene is saturated or substantially saturated with water. Various expedients provide for this aqueous condition.

One recommended procedure involves wetting a bed of the ion-exchange resin by introducing water into the bed prior to its contact with perchloroethylene. An ion-exchange resin bed containing at least 32 percent by weight of water is adequate to impart benefits. In the continued use of the bed, without intervening regeneration, it is sometimes even advantageous to treat moist perchloroethylene either by not drying moist perchloroethylene before passing it into contact with the bed or by intentionally incorporating a minor quantity of water in the perchloroethylene prior to its contact with the bed. Passing the acidic perchloroethylene through a body of water prior to contacting it with the ion-exchange resin will accomplish this. In employing columns of ion-exchange resin beds, as provided by the placing of the resin in a vertically disposed tubular container, the perchloroethylene may be passed downwardly through the resin bed having a pool of water above or at its upper portion.

When regeneration of the ion-exchange resin is practiced with reasonable frequency, the moisture imparted to the bed by passage of the aqueous alkaline regenerating medium through the bed provided it is not removed may be utilized to impart the desired aqueous condition.

Intimate contact between the acidic perchloroethylene and ion-exchange resin is accomplished by any of a variety of procedural expedients. Any manner which provides intimate contact of the perchloroethylene and synthetic ion-exchange resin followed by separation of the perchloroethylene from the resin is within the scope of the present invention.

In practice, a liquid permeable bed of the synthetic carbonaceous ion-exchange resin is established, such as by packing a suitable column with the resin. Through this bed, the perchloroethylene is flowed until regeneration or reactivation of the bed is indicated by its diminished ability to remove the aciduous components. Subsequent to discontinuing the flow of perchloroethylene, the bed may be regenerated by treatment with water, or more preferably, by treatment with an aqueous solution of an alkaline material such as aqueous sodium hydroxide, sodium hypochlorite, or the like. At the conclusion of the regeneration cycle, the flow of acidic perchloroethylene may be resumed until regeneration is again indicated. Thus, cyclic operation of a single bed of catalyst is a usual mode of operation.

Alternate passage of the perchloroethylene and regenerating media through the ion-exchange bed is often conducted by countercurrent flow of the respective liquids. For example, perchloroethylene may be passed unidirectionally and downwardly through a vertically disposed bed of the ion-exchange resin until the acidity of the perchloroethylene is no longer being reduced, or more preferably, until the efficiency of the ion-exchange bed is below optimum. Then, after halting the flow of perchloroethylene and preferably draining or removing most or all of the perchloroethylene which may be momentarily trapped in the bed, the regenerating medium is passed upwardly through the bed. Regeneration is continued until the resin is again capable of removing the acidic components of perchloroethylene. Thereafter, the downward flow of perchloroethylene is commenced. As already indicated, the bed is maintained in a wet or flooded condition during the treatment of perchloroethylene.

According to a further technique for employing ion-exchange bed in the contemplated invention, at least a pair of beds are provided to permit a continuous technique for conducting the cyclic operation. By employing at least two beds, one may be "on stream" and it may be used for the treatment of perchloroethylene while the other bed is being regenerated. While the "on stream" bed is decreasing in activity, the second bed is undergoing regeneration and will be available when it is necessary to regenerate the first bed. Depending on the relative rates of flow, two or more beds may be employed in the above general manner to treat continuously the perchloroethylene.

The specific ion-exchange resin, the feed rate of perchloroethylene, and the concentration of the acidic material in the perchloroethylene all govern the frequency with which regeneration is necessary. Different ion-exchange resins possess different capacities for removing the acidic constituents or impurities of the perchloroethylene. Usually, the capacity of the bed (or its capacity based on the ability of a cubic foot thereof to absorb a given quantity of acidic impurity is predetermined) as by simple small scale tests, and thereafter the bed is operated in a manner consistent with such determinations. By adequate regeneration, the life of the ion-exchange resin may be extended to such a degree that a major limiting factor in its use is usually the gradual physical deterioration of the resin, either by loss of porosity, gradual physical disintegration and loss from the bed as fines, or the like.

The bed of ion-exchange in illustrative operations is composed of a large mass of individual resin beads, usually ranging in size from about 10 to about 100 mesh, and preferably 20 to 50 mesh. A bed of resin beads, the majority of which are of this size, is effectively handled in a tower as a column with the bed disposed in a tubular, or like container. However, the ion-exchange synthetic resin may be in any form which provides a liquid permeable bed.

Contact of the perchloroethylene with the ion-exchange resin bed is accomplished over a wide range of temperatures, normally atmospheric temperatures being convenient and appropriate. Usually preferable is operation at temperatures substantially below the boiling point of the perchloroethylene, particularly since this minimizes losses resulting from vaporization and the necessity for extensive gas tight equipment. Temperatures between about 10° C. and a maximum of about 70° C. are used with most frequency. Except for providing pressure differentials to facilitate passage of the perchloroethylene through the resin, essentially atmospheric pressures are convenient, although both superatmospheric and subatmospheric pressure may be used.

A large number of synthetic carbonaceous organic ion-exchange resins which are inert with respect to the perchloroethylene are useful for the purpose of this invention. Typical of the useful synthetic carbonaceous ion-exchange resins are those produced by sulfonation of polystyrene and copolymers of styrene with vinyl benzene. See, for example, United States Letters Patents 2,366,077 and 2,631,127. Other sulfonated resins of high molecular weight such as sulfonated phenol-formaldehyde resins and modified sulfonated phenol-formaldehyde resins may be used.

Anion-exchange resins useful for the herein described purposes include the amino and like nitrogenous resins such as those derived from styrene and its copolymers. Typical anion-exchange resins of this character are described in United States Letters Patent 2,591,573. Also useful as the anion-exchange resins, prepared, for example, by reacting the ammonia, is a primary or a secondary amine with an insoluble, cross-linked polymer of a glycidyl ester of acrylic acid or of an alpha-substituted acrylic acid such as alpha-methyl acrylic acid. Anion-exchange resins of this character are illustrated in United States Letters Patent 2,630,429.

Both anion and cation exchange resins may be utilized. Strongly basic and weakly basic anion-exchange resins are included, being employed for the most part in their hydroxyl or basic form. Also, both weakly and strongly acidic cation-exchange resins used in their hydrogen or acid form are included.

Both weakly basic and strongly basic anion-exchange resins are especially suitable for the purification of perchloroethylene. The strongly basic anion-exchange resins described in United States Letters Patent 2,591,573 (polystyrene quaternary amine type resins in their hydroxyl or basic form) are typical of those particularly suitable for treatment of perchloroethylene. Also preferred are weakly basic phenol-formaldehyde type anion resins in their hydroxyl form.

Acidity of the perchloroethylene may be determined by specific techniques. One measurement of the acidity of perchloroethylene involves adding 100 millimeters of neutral water to 100 millimeters of perchloroethylene and shaking for 5 to 10 minutes. Thereafter, the aqueous phase is separated and the pH determined. At low pH, the quantitative amount of acidity present is not indicated by pH alone. Thus, the aqueous phase is titrated to 7 pH with 0.01 N NaOH. The latter measurement (or titer) is a more quantitative indicia of acidity.

Perchloroethylene having a pH below about 4.0 and more usually below about 3.5 is usually treated. Besides being below about 4.0 pH, perchloroethylene usually has that quantity of acidity which requires at least 5 milliliters of 0.01 normal NaOH to titrate them to neutrality in accordance with the above procedure. Quite frequently, the acidity of the perchloroethylene measures from 10 to 400 milliliters of 0.01 normal NaOH prior to contact with the ion-exchange resin. By virtue of this treatment, it is possible to reduce the acidity, as indicated by the amount of 0.01 normal NaOH required to bring the aqueous phase to neutrality and/or to raise the pH of the solution from below 3.5 to 4.0 to from between 6.0 and 8.0, or substantially neutrality. Frequently, under optimum conditions, the treated perchloroethylene is essentially neutral, e.g., at pH 7.

Regeneration of the ion-exchange resin is effected by contacting it with either water or aqueous alkaline media. Aqueous alkaline solutions containing sodium hydroxide, potassium hydroxide, sodium hypochlorite, potassium hypochloride, sodium carbonate, etc., are used. Generally, the alkaline solutions are dilute containing from 1 to 15 percent by weight of the alkaline materials.

The following example illustrates the manner in which the present invention may be practiced:

EXAMPLE

Perchloroethylene obtained from the chlorination of propane and recovered from the reaction mixture by simple distillation was subjected to treatment by passing through a colum of an Amberlite ion-exchange resin. The column consisted of a vertically disposed four-foot section of a glass pipe one inch in diameter filled with sufficient resin to provide a resin bed 36 inches deep along the line of flow therethrough. Glass wool plugs were placed at either end of the resin bed. The bed was then flooded with water. Perchloroethylene thereafter was passed downwardly through the bed flooded with water and out the bottom.

The acidity of the influent and effluent stream of perchloroethylene was tested in accordance with the above described procedure to determine its pH and titer against 0.01 N NaOH.

The resin in different runs was either Amberlite IRA 400, a strongly basic polystyrene quaternary amine type resin or Amberlite IR 45, a weakly basic phenylformaldehyde type anion resin, both marketed by Rohm and Haas Company. Both resins were used in their hydroxyl form. The bed itself was composed of 20 to 50 mesh beads of the respective resin.

Table I summarizes the specific conditions and results obtained by following the above procedure:

Table I

| Run | Resin | Influent Acidity | | Effluent Acidity | |
|---|---|---|---|---|---|
| | | pH | Titer [1] | pH | Titer [1] |
| 1 | IRA 400 | 3.9 | 43 | 7.0 | None |
| 2 | IR 45 | 3.9 | 43 | 7.0 | None |
| 3 | IR 45 | 3.0 | 35 | 6.2 | None |
| 4 | IRA 400 | 3.0 | 35 | 6.6 | None |
| 5 | IRA 400 | 4.0 | 2.4 | 6.8 | 0.2 |
| 6 | IRA 400 | 3.0 | 12.2 | 6.8 | 0.5 |
| 7 | IR 45 | 3.5 | 6.3 | 6.3 | None |
| 8 | IRA 400 | 7.0 | 7.5 | 6.8 | 0.2 |

[1] Milliliters of 0.01 N NaOH required to neutralize 100 milliliters of water shaken with 100 milliliters of sample.

The acidic nature of the perchloroethylene removed by the present process apparently arises in conjunction with perchloroethylene manufacture. Perchloroethylene prepared by the vapor phase pyrolysis and chlorination of hydrocarbons contains usually from 1 to 4 carbon atoms such as methane, ethane, propane and butane at temperatures from 400° C. to 700° C. possesses such acidity and is accordingly treated successfully by this process. Likewise, perchloroethylene resulting from the chlorination of tetrachloroethane under suitable temperature conditions contains acidity which may be removed in the manner of this invention. Of course, any perchloroethylene having undesirable acidity, regardless of its source, can be treated.

In typical practices, the reaction products obtained in the preparation of perchloroethylene are fractionally distilled, or are otherwise physically separated by a comparable procedure to give perchloroethylene containing little or no other chlorinated hydrocarbon or unreacted reagents. Also, it is usual to selectively condense the organic phase provided by the reaction from the major portion of a byproduct hydrochloric acid. For example, such perchloroethylene reaction products are condensed by treating the reaction gases with an aqueous water wash and condensation. Such perchloroethylene separated from by-product hydrochloric acid is treated with synthetic carbonaceous ion-exchange resins.

This application is a continuation-in-part of application Serial No. 463,799, filed October 21, 1954.

Although the present invention has been described with reference to specific details of certain embodiments, it is not intended that the invention be construed as limited to such details except insofar as they are defined in the appended claims.

I claim:
1. The method of reducing the acidity of perchloroethylene having a pH below 4.0 which comprises contacting the acidic perchloroethylene and a synthetic organic ion-exchange resin containing at least 32 percent by weight of water and thereafter separating from the resin perchloroethylene whereby the pH of the perchloroethylene is raised.

2. The method which comprises passing acidic perchloroethylene containing acidity not materially affected by treatment with aqueous alkaline materials into contact with a water-containing bed comprised of small beads of a synthetic organic ion-exchange resin, said bed containing at least 32 percent by weight of water, and separating from said bed perchloroethylene which has a reduced content of acidity not materially affected by treatment with aqueous alkaline materials.

3. The method of claim 2 wherein said aqueous alkaline materials comprise aqueous solutions of sodium hydroxide.

4. The method of reducing the acidity of perchloroethylene having a pH below 4.0 which comprises contacting the acidic perchloroethylene with a synthetic organic ion-exchange resin while the perchloroethylene is substantially saturated with water to thereby maintain at least 32 percent by weight water in said resin and thereafter separating the perchloroethylene whereby its pH is raised.

5. The method of claim 4 wherein the ion-exchange resin is an anion resin.

6. The method of claim 4 wherein the ion-exchange resin is an anion polystyrene quaternary amine resin in its hydroxyl form.

7. The method which comprises passing acidic perchloroethylene downwardly through a column of synthetic organic anion-exchange resin in aqueous moist condition, said resin containing at least 32 percent by weight of water and obtaining as the effluent stream from the column perchloroethylene from which acidity has been removed.

8. The method of claim 7 wherein the acidic perchloroethylene has a pH of below 4.0 and the effluent perchloroethylene is a pH 6 to 8.

References Cited in the file of this patent
UNITED STATES PATENTS

| 2,566,353 | Mills | Sept. 4, 1951 |
| 2,663,702 | Kropa | Dec. 22, 1953 |
| 2,852,572 | Shukys et al. | Sept. 16, 1958 |

OTHER REFERENCES

Amberlite Ion Exchange (pamphlet), September 1953, Rohn & Haas Co., Washington Square, Philadelphia 5, Pa., 14 pages, only pages 4 and 9 needed.

UNITED STATES PATENT OFFICE

CERTIFICATE OF CORRECTION

Patent No. 2,888,495                                         May 26, 1959

Lehr F. Kissling

It is hereby certified that error appears in the printed specification of the above numbered patent requiring correction and that the said Letters Patent should read as corrected below.

Column 4, line 3, for "is a primary" read -- a primary --; line 28, for "5 to 10 minutes" read -- 5 or 10 minutes --; line 46, for "3.5 to 4.0" read -- 3.5 or 4.0 --; column 6, line 56, list of references cited, under "OTHER REFERENCES", for "Rohn & Haas Co.," read -- Rohm & Haas Co., --.

Signed and sealed this 1st day of March 1960.

(SEAL)
Attest:

KARL H. AXLINE
Attesting Officer

ROBERT C. WATSON
Commissioner of Patents